Inventors
A. Z. SIDOROWICZ
J. TARCZYNSKI
By Robert B. Harmon
Attorney

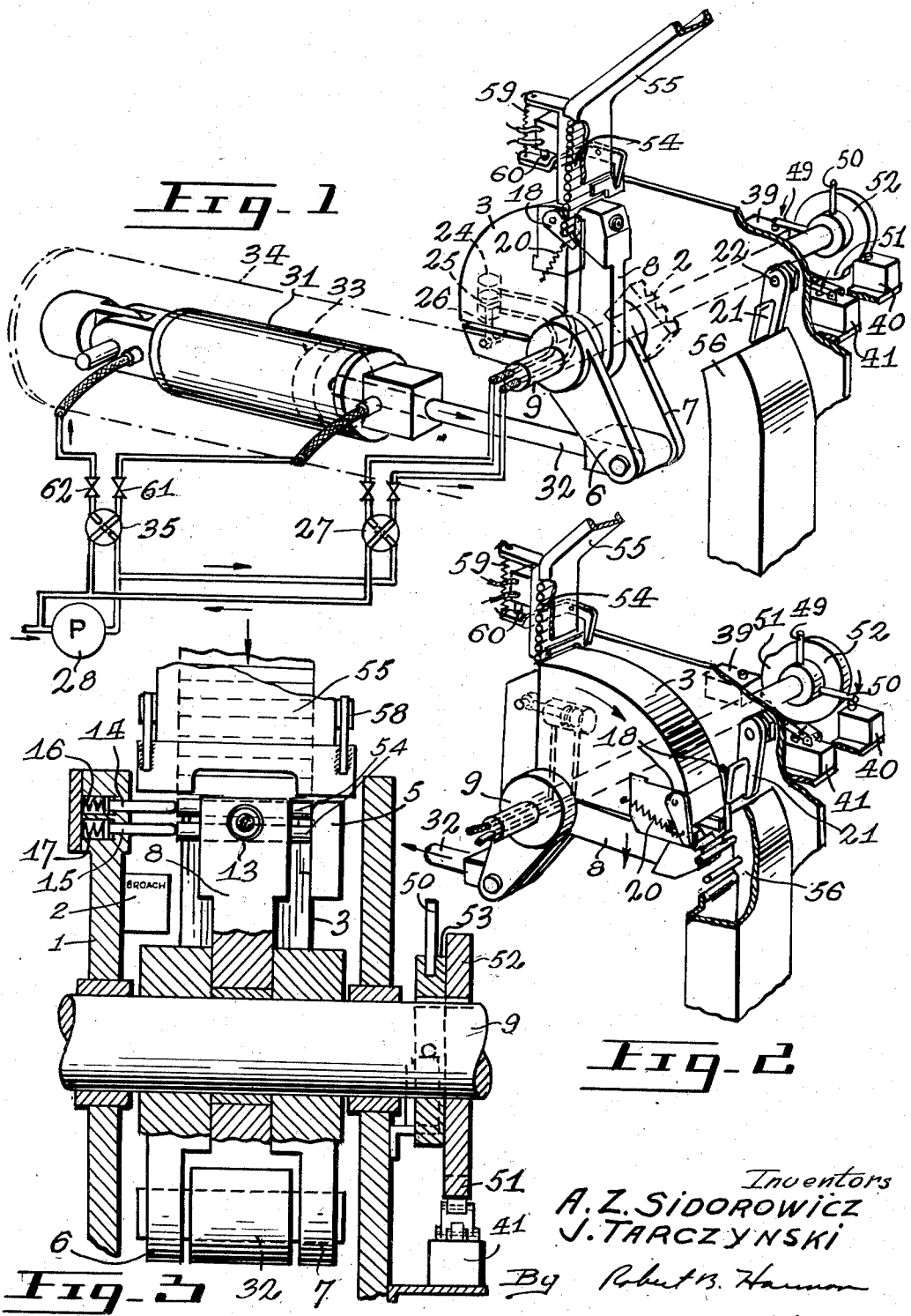

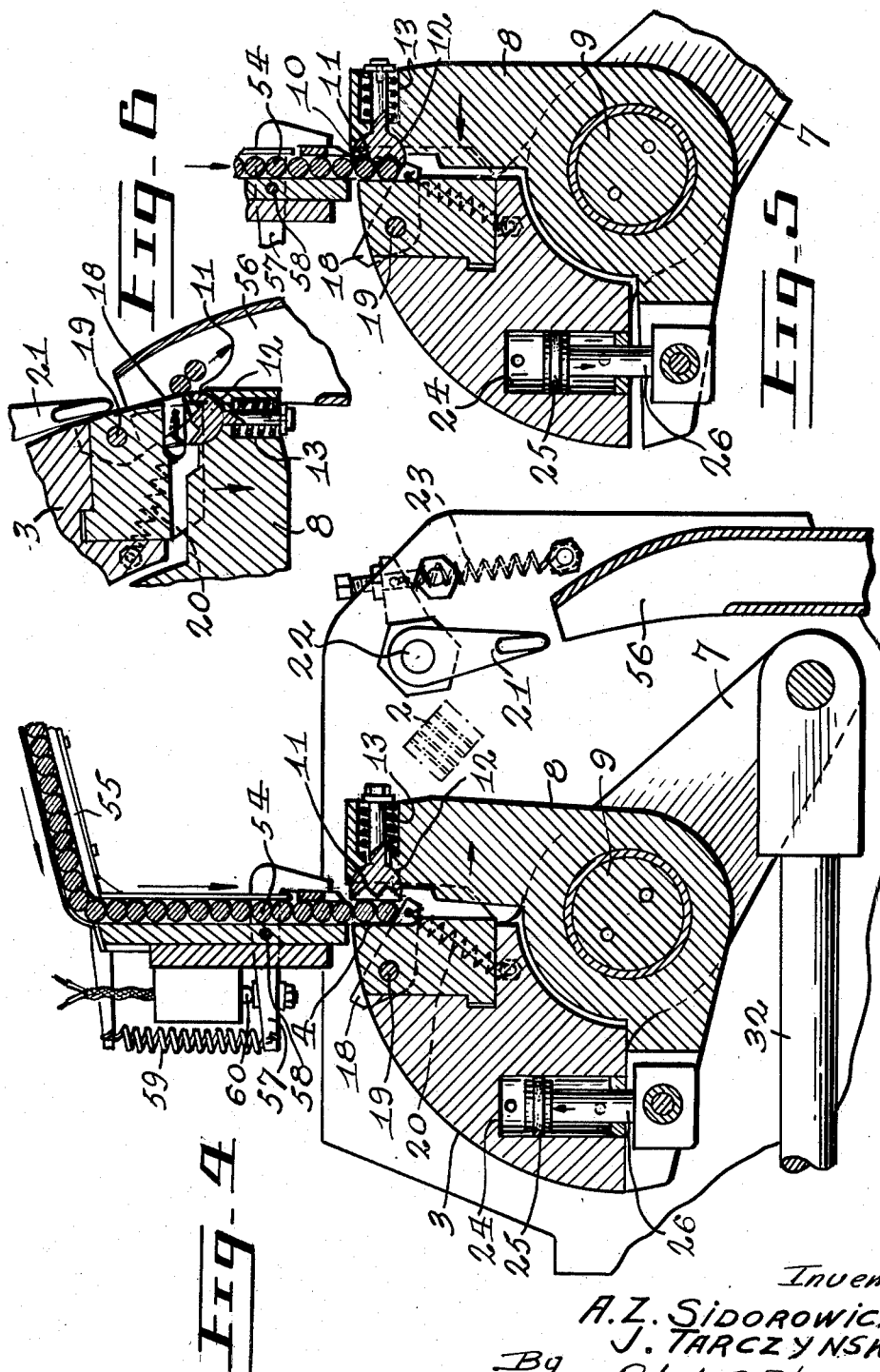

United States Patent Office 2,806,410
Patented Sept. 17, 1957

2,806,410

BROACHING MACHINE

Alexander Z. Sidorowicz and John Tarczynski, Notre Dame de Grace, Montreal, Quebec, Canada, assignors to Northern Electric Company, Limited, Montreal, Quebec, Canada, a corporation of Canada Application April 4, 1955, Serial No. 499,107

5 Claims. (Cl. 90—33)

This invention relates to broaching machines of the type which is provided with hydraulic driving mechanism.

The invention is particularly concerned with hydraulic broaching machines adapted for surface broaching an end face of a work piece. In the interest of economy, maintenance and precision of operation it is desirable in machines of this nature to automatically feed and positively position the work pieces therein.

The general object of this invention is to provide a precision broaching machine which is economical to construct and maintain.

A further object of this invention is to provide a broaching machine having hydraulically operated jaws adapted to grip and release the work pieces.

A still further object of the invention is to provide a broaching machine adapted to positively position the work pieces within the clamping jaws.

Another object of the invention is to provide a broaching machine having means to prevent damage to the machine through mis-alignment of the work pieces.

A further object of the invention is to provide a machine having means to open and close the jaws at desired points of the broaching stroke.

Another object of the invention is to provide a broaching machine having a novel means for ejecting the work pieces after the completion of the broaching operation.

A further object of the invention is to provide a broaching machine having means adapted to automatically supply the work pieces to the machine.

These and other objects of the invention are obtained in one embodiment of the invention by providing a hydraulically operated broaching machine having: a stationary broach; a carrier assembly consisting of a pivoted sector member adapted to oscillate through an angle in a vertical plane and having a shelf-like receiving means closed at one end and disposed at the outer extremity of the vertical edge face of the sector member arranged to receive a predetermined number of the work pieces so that an end face thereof extends a predetermined distance from a side face of the sector member; a clamping lever with a jaw in movable relation therein capable of positioning and clamping the work piece within the receiving means, the sector member and clamping lever lying in a plane parallel to and separated from the working surface of the broach; means to automatically feed and position a predetermined number of the work pieces within the receiving means; a driving unit capable of oscillating the carrier assembly through said angle.

A better understanding of the invention may be had by referring to the following description, taken in conjunction with the drawings, in which like numerals refer to like parts.

In the drawings:

Fig. 1 shows a perspective view of the broaching machine in which the invention is embodied;

Fig. 2 shows a fragmentary enlarged view, in elevation, of a portion of the broaching machine illustrated in Fig. 1 in more detail;

Fig. 3 shows a vertical section of the machine through axis of main shaft of the apparatus illustrated in Fig. 2;

Fig. 4 shows a vertical section perpendicular to the axis of shaft in Fig. 1, loading position;

Fig. 5 shows the clamping jaws in Fig. 1, clamping position;

Fig. 6 shows the clamping jaws in Fig. 2, ejection position; and

Figure 7:
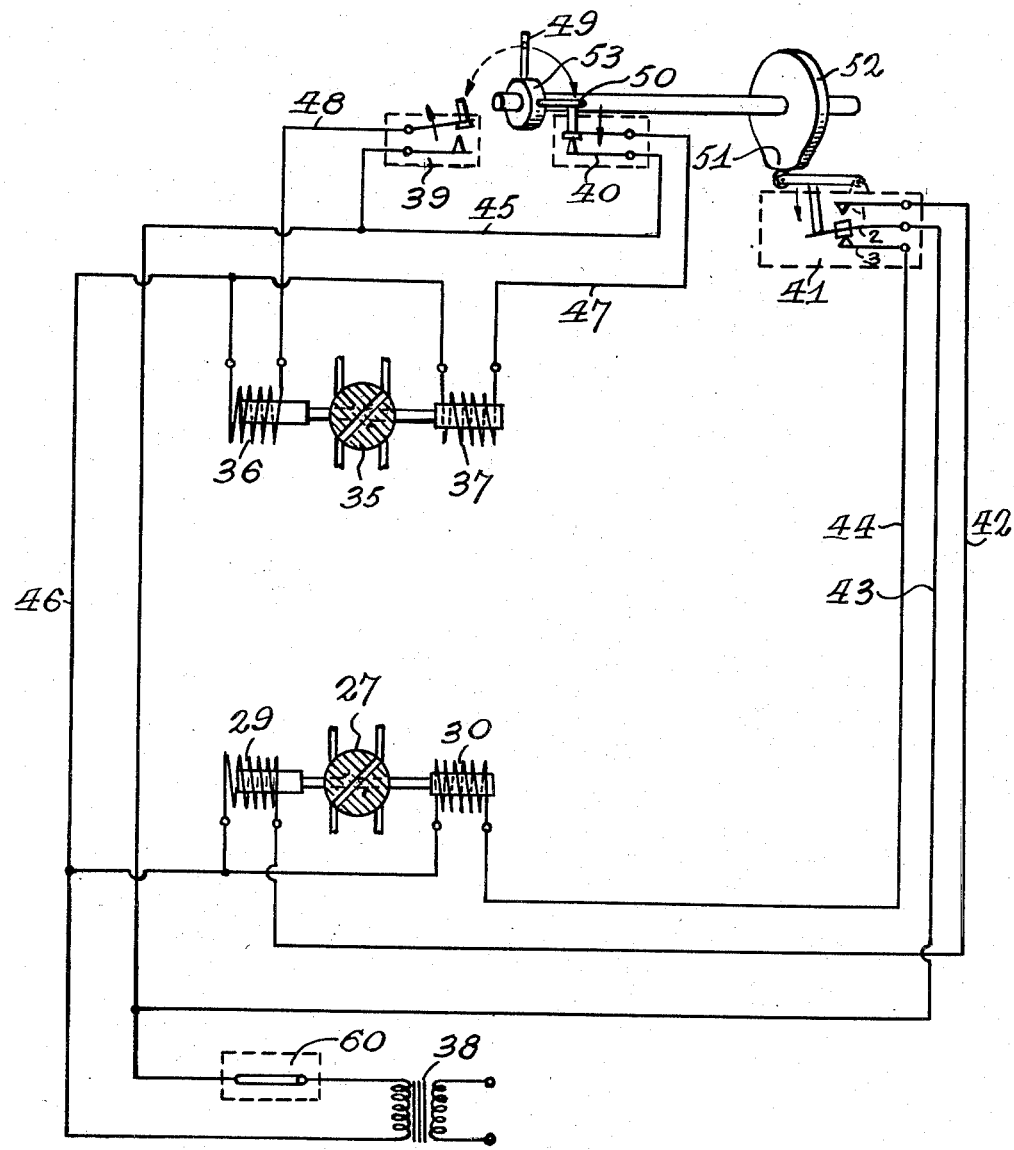
Fig. 7 shows the electrical circuit for the control of the broaching machine illustrated in the above figures.

Referring to the drawings there is shown a frame 1 on which a stationary broach 2 is disposed, a carrier assembly consisting of a pivoted sector member 3 having a shelf-like recess 4, closed at its end 5, disposed at the outer extremity of the vertical edge face of the sector member 3 and arranged to receive a predetermined number of work pieces so that an end face thereof extends a predetermined distance from the side face of the sector member 3 and of arms 6, 7, a clamping lever 8, sector member 3 being secured to the shaft 9 and lever 8 movable thereon, a self-adjusting equalizing jaw inserted in the lever 8 consisting of the member 10 with V-shaped teeth 11 and a curved face 12 movable in the lever 8 and spring loaded by the spring 13, a work piece setting means attached to the frame 1 consisting of locating members 14, 15 and spring loaded by springs 16, 17 respectively, work piece ejector consisting of lever member 18 pivoted in the sector member 3 by pivot 19 and spring loaded by spring 20 and associated with stop 21, stop 21 being pivoted at 22 and spring loaded by spring 23, hydraulic clamping and releasing means consisting of cylinder 24, piston 25, piston rod 26.

The hydraulic clamping and releasing means are controlled by a four way valve 27, the valve being connected to the fluid pump 28. The valve 27 is electrically operated by the solenoids 29, 30.

The driving unit, which oscillates the carrier assembly, consists of cylinder 31 containing rod 32, having at one of its extremities piston 33 and pivoted at the other extremity to arms 6, 7. Cylinder 31 is supported by tube 34.

The driving unit which oscillates the carrier assembly is controlled by a four way valve 35, the valve being connected to the pump 28. The valve 35 is electrically operated by solenoids 36, 37.

Electrical energy is supplied to solenoids 29, 30, 36, 37 from source 38 through microswitches 39, 40, 41 connected thereto by leads 42, 43, 44, 45, 46, 47, 48, the switches 39, 40, 41 being actuated by projections 49, 50, secured to cam disc 53 and projection 51 of cam disc 52.

The work pieces 54 are contained in the supply magazine 55 and ejected into the discharge chute 56. The supply magazine 55 is provided with a safety device consisting of the lever 57 pivoted at 58 and spring loaded by spring 59.

Associated with lever 57 is the microswitch 60 through which the power supply to the machine is controlled. The speed control of the machine is effected by valves 61, 62 controlling the speed of oscillating movement of the sector member 3 within widely adjustable limits.

In the operation of the mechanism the machine is set in motion, the speed being adjusted by valves 61, 62, so that the driving unit oscillates the carrier assembly, the driving unit being controlled by the reciprocating valve 35 the actuation of which is controlled by solenoids 36, 37 the former being energized and the latter deenergized at the downward oscillation of the oscillating assembly. The energizing of the solenoid 36 is controlled by switch 39 which has been actuated by projection 49 to close its contacts, the circuit being traced from power source 38, conductor 46, solenoid 36, conductor 48, switch 39, conductor 45, power source 38.

At the commencement of the oscillation of the carrier assembly the equalizing jaw is in the unclamped position which results from contacts 1, 2 of switch 41 being closed by the action of projection 51 of cam disc 52 which allows energy to be supplied to solenoid 30 thus actuating clamping valve 27 so that rod 26 of the hydraulic clamping and releasing assembly is in the upward position. The circuit for the energizing of solenoid 30 may be traced from power source 38, solenoid 30, conductor 42, contacts 1, 2 of switch 41, conductor 43, power source 38.

The work pieces 54 having been inserted in magazine 55 fall into recess 4 of sector member 3 in the manner previously described. While two work pieces are shown in the recess 4 of the illustrated embodiment of the invention, the recess 4 may be made to accommodate a greater number of work pieces. Upon the work pieces 54 falling into the recess 4, and the sector member 3 starting to oscillate, the locating members 14, 15 press the work pieces against the end 5 of recess 4 in sector member 3 thus positioning the work pieces lengthwise.

It may so happen that some of the work pieces 54 are not correctly located after they fell into the recess 4. Should this happen the projecting portion of parts 54 will engage, when rotary movement of the sector member starts, the free end of cantilever 57 turning it around its pivot point and actuating a microswitch 60 located at the other end of cantilever 57. The microswitch 60 is connected into the circuit of a coil controlling the hydraulic solenoid operated valve 35, and its operation will stop immediately the rotary movement of the sector member, thus preventing any damage.

As the carrier assembly's motion proceeds the clamping equalizing jaw commences its movement to the clamping position which allows the work pieces 54 to adjust themselves axially by means of the V-shaped teeth 11 and curved face 12 of member 10. The clamping action results from the closing of contacts 2, 3 of microswitch 41 by the action of projection 51 of cam disc 52 which allows energy to be supplied to solenoid 29 thus actuating the clamping valve 27 so that rod 26 of the hydraulic clamping and releasing assembly is in the forward position. The circuit for the energizing of solenoid 29 can be traced from power source 38, solenoid 29, conductor 44, contacts 2, 3 of switch 41, conductor 43, power source 38.

As the carrier assembly continues to oscillate the work pieces are broached on an end face, whereupon, when the work pieces pass the broaching area, contacts 2, 3 and 1, 2 of switch 41 open and close respectively which causes solenoids 29 and 30 to be deenergized and energized respectively by virtue of the projection 51 of cam disc 52 allowing rod 26 of the hydraulic clamping member to assume its upward position thus releasing the clamping lever 8.

Since the carrier assembly swings through an angle of 90 degrees, the work pieces 54 will be in a horizontal position in the recess 4 at this time. In order to eject the work pieces 54, the free end of the ejection lever 18, which remains in contact with the bottom of work piece 54 during the broaching operation, strikes the yielding stop 21 the force of which ejects the parts into the discharge tube 56.

Upon the ejection of the work pieces 54, the carrier assembly returns to its original position through the action of the reciprocating assembly controlled by valve 35 actuated by solenoids 36, 37 as described for solenoids 29, 30.

What is claimed:

1. A broaching machine, adapted to broach an end face of a work piece, having a stationary broach comprising in combination: a carrier assembly consisting of a pivoted sector member adapted to rotate through an angle in a vertical plane and having a work piece receiving shelf-like recess therein closed at one end and disposed at the outer extremity of the vertical edge face of the sector arranged to receive a predetermined number of work pieces so that an end face thereof extends a predetermined distance from the side face of the sector member, a clamping lever having a work piece positioning and clamping means in movable engagement therewith disposed adjacent the open side of said recess pivoted on the sector member, the sector member and lever lying in a plane parallel to and separated from the working plane of the broach, hydraulic means for actuating the clamping lever, an electrical switch means disposed on the carrier assembly; a reversible hydraulic driving means connected to the carrier assembly whereby the carrier is oscillated through said angle; fluid supply means connected to the hydraulic means, valve mechanisms included in the supply means, electrically operated means in mechanical association with the valve mechanisms and included in an electrical circuit with the switch means, said switch means being arranged to effect the operation of the electrically operated means to permit a continuous cycle of unclamping, positioning, clamping and unclamping of the clamping lever during the loading, broaching and ejection of the work piece in timed relation with the oscillation of the carrier.

2. A broaching machine, adapted to broach an end face of a work piece, having a stationary broach comprising in combination: a carrier assembly consisting of a pivoted sector member adapted to rotate through an angle in a vertical plane and having a work piece receiving shelf-like recess thereon closed at one end and disposed at the outer extremity of the vertical edge face of the sector arranged to receive a predetermined number of work pieces so that an end face thereof extends a predetermined distance from the side face of the sector member, a clamping lever having a work piece positioning and clamping means in movable engagement therewith disposed thereon adjacent the open side of the recess pivoted on the sector member consisting of a spring loaded element movable within said lever and having a notched work piece gripping face, the notches having a predetermined configuration, the sector member and lever lying in a plane parallel to and separated from the working plane of the broach, the notches lying in a plane parallel to the axis of oscillation of the carrier assembly, hydraulic means for actuating the clamping lever, an electrical switch means disposed on the carrier assembly; a reversible hydraulic driving means connected to the carrier assembly whereby the carrier is oscillated through said angle; fluid supply means connected to the hydraulic means, valve mechanism included in the supply means, electrically operated means in mechanical association with the valve mechanisms and included in an electrical circuit with the switch means, said switch means being arranged to effect the operation of the electrically operated means to permit a continuous cycle of unclamping, positioning, clamping and unclamping of the clamping lever during the loading, broaching and ejection of the work piece in timed relation with the oscillation of the carrier.

3. A broaching machine in accordance with claim 2 in which the said receiving recess has in combination therewith a work piece adjusting member for positioning the work piece lengthwise within the said recess consisting of a spring loaded member disposed on the frame of said machine adjacent said opening, the force of the spring being related to weight of the work pieces so as to permit the work pieces to enter the said recess and be pressed thereagainst the closed end.

4. A broaching machine adapted to broach the end face of a workpiece having a stationary broach and a supply magazine for holding a plurality of work pieces comprising in combination: a carrier assembly consisting of a pivoted sector member adapted to rotate through an angle in a vertical plane having a work piece receiving shelf-like recess therein closed at one end and disposed at the outer extremity of the vertical edge face of the sector arranged to receive a predetermined number of work pieces so that an end face thereof extends a predetermined distance from the side face of the sector member the open top side being directly disposed adjacent the feeding end of said magazine, a clamping lever having a work piece positioning and clamping means disposed adjacent the open side face of said recess pivoted on the sector member consisting of a spring loaded element movable within said lever and having a notched work piece gripping face, the notches having a predetermined configuration, the sector member and lever lying in a plane parallel to the working surface of the broach, the notches lying in a plane parallel to the axis of oscillation of the carrier assembly, hydraulic means for actuating the clamping lever, an electrical switch disposed on the carrier assembly; a work piece adjusting member for positioning the work piece lengthwise within the said recess consisting of a spring loaded member disposed on the frame of said machine adjacent said opening, the force of the spring being related to weight of the work pieces so as to permit the work pieces to enter the said recess and be pressed thereagainst the closed end; a safety device consisting of an inverted L-shaped spring loaded lever pivoted on the frame of the machine and disposed adjacent the periphery of the sector arranged to oscillate around an axis which is parallel to the axis of oscillation of the sector member, an electrical operated switch in association therewith connected to the energy source for the operation of the machine; a reversible hydraulic driving means connected to the carrier assembly whereby the carrier is oscillated through said angle; fluid supply means connected to the hydraulic means, valve mechanisms included in the supply means, electrically operated means in mechanical association with the valve mechanism and included in an electrical circuit with the switch means, said switch means being arranged to effect the operation of the electrically operated means to permit a continuous cycle of unclamping, positioning, clamping and unclamping of the clamping lever during the loading, broaching and ejection of the work piece in timed relation with the oscillation of the carrier.

5. A broaching machine in accordance with claim 4 in which the said carrier assembly oscillates through an angle in a vertical plane of approximately ninety degrees having in combination means for ejecting the work pieces comprising a spring loaded ejector lever pivoted on the carrier assembly, the free end being arranged so as to engage with the bottom of the work piece and a spring loaded stop disposed on the frame of the machine arranged in the path of travel of the ejector lever so that it comes in engagement therewith in timed relation with the completion of the broaching operation whereby said work pieces are forcibly ejected from the said clamping jaw.

References Cited in the file of this patent
UNITED STATES PATENTS

| | | |
|---|---|---|
| 2,327,598 | Fiegel | Aug. 24, 1943 |
| 2,340,653 | Fiegel | Feb. 1, 1944 |
| 2,571,904 | Lofgren | Oct. 16, 1951 |